(12) United States Patent
Kuipers et al.

(10) Patent No.: US 7,189,047 B2
(45) Date of Patent: Mar. 13, 2007

(54) APPARATUS FOR MOVING A BATTERY

(75) Inventors: Roy Kuipers, Rockwall, TX (US); Min Chul Kim, The Colony, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 285 days.

(21) Appl. No.: 10/723,844

(22) Filed: Nov. 26, 2003

(65) Prior Publication Data

US 2005/0111939 A1    May 26, 2005

(51) Int. Cl.
*B66C 23/18* (2006.01)
(52) U.S. Cl. .............. 414/280; 414/626; 212/179; 254/264
(58) Field of Classification Search ........... 414/280, 414/591, 626, 749.6; 212/179; 254/264, 254/385
See application file for complete search history.

(56) References Cited

U.S. PATENT DOCUMENTS

| | | | | |
|---|---|---|---|---|
| 3,652,057 A | * | 3/1972 | Brown | 254/264 |
| 4,005,782 A | * | 2/1977 | Crockett | 414/591 |
| 4,030,705 A | * | 6/1977 | Bontrager | 254/264 |
| 4,126,232 A | * | 11/1978 | Orawiec | 212/312 |
| 4,808,058 A | * | 2/1989 | Carney et al. | 414/343 |
| 5,102,283 A | * | 4/1992 | Balzola Elorza | 414/404 |
| 5,420,772 A | * | 5/1995 | Evans | 362/386 |
| 6,041,949 A | * | 3/2000 | Walker et al. | 212/179 |
| 6,264,419 B1 | * | 7/2001 | Schinzel | 414/751.1 |
| 2003/0221914 A1 | * | 12/2003 | Smith et al. | 187/244 |
| 2004/0060886 A1 | * | 4/2004 | Windbergs | 212/179 |

* cited by examiner

*Primary Examiner*—James Keenan
(74) *Attorney, Agent, or Firm*—Law Office of Donald D. Mondul

(57) ABSTRACT

An apparatus for moving a battery relative to a shelf unit includes: (a) a motion generating unit presenting a first force in a first motion type at a first output locus; (b) a motion translating unit receiving the first force and translating the first force to present a second force related to the first force in a second motion type at a second output locus; (c) a battery engaging structure coupled with the second output locus for applying the second force to the battery; and (d) a substantially rigid frame supporting the motion generating unit and the motion translating unit and cooperating with the shelf unit to substantially fixedly situate the frame during the moving. The moving is effected in a generally vertical axis in response to the second force.

15 Claims, 4 Drawing Sheets

… (US 7,189,047 B2)

APPARATUS FOR MOVING A BATTERY

BACKGROUND OF THE INVENTION

The present invention is directed to apparatuses for handling batteries located with a shelf structure, and especially to apparatuses for handling lead-acid batteries located with a shelf structure in a telecommunication facility.

Lead-acid batteries are used in telecommunication facilities, such as telephone company central offices, to provide battery power for telephone operations. The lead-acid batteries are large, very heavy and unwieldy. Their great weight and awkward cylindrical shape make the lead-acid batteries likely to cause injury to personnel or machinery during movement because of acid spills, or mashing fingers or other mishaps.

There is a need for an apparatus for moving batteries that provides safety and sureness of handling during battery movement.

SUMMARY OF THE INVENTION

An apparatus for moving a battery relative to a shelf unit includes: (a) a motion generating unit presenting a first force of a first motion type at a first output locus; (b) a motion translating unit receiving the first force and translating the first force to present a second force related to the first force of a second motion type at a second output locus; (c) a battery engaging structure coupled with the second output locus for applying the second force to the battery; and (d) a substantially rigid frame supporting the motion generating unit and the motion translating unit and cooperating with the shelf unit to substantially fixedly situate the frame during moving. Moving is effected in a generally vertical direction in response to the second force.

It is, therefore, an object of the present invention to provide an apparatus for moving batteries that provides safety and sureness of handling during battery movement.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
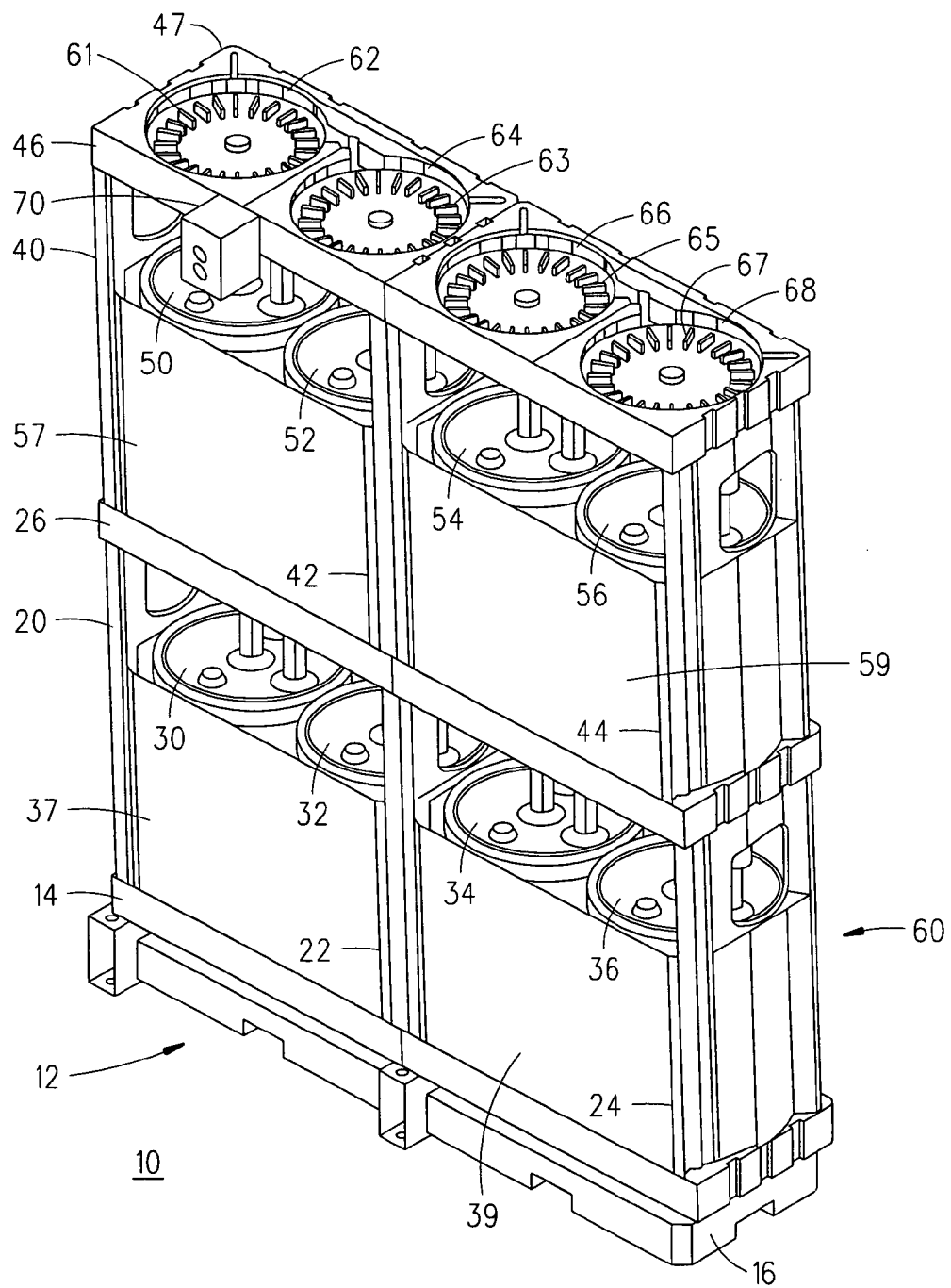
FIG. 1 is a perspective view illustrating a representative installation of a plurality of batteries with a shelf unit.

FIG. 1 is a perspective view illustrating a representative installation of a plurality of batteries within a shelf unit. In FIG. 1, a battery installation 10 includes a shelf unit 12 having a base 16 upon which a lower shelf 14 is supported. Upright vertical supports 20, 22, 24 support a second shelf 26 in spaced relation above lower shelf 14. Batteries 30, 32, 34, 36 are situated on lower shelf 14. Removable shields 37, 39 are positioned adjacent batteries 30, 32, 34, 36. Additional upright vertical supports 40, 42, 44 support a third shelf 46 in spaced relation above second shelf 26. Batteries 50, 52, 54, 56 are situated on second shelf 26. Removable shields 57, 59 are positioned adjacent batteries 50, 52, 54, 56. Further additional vertical supports and shelves (not shown in FIG. 1) may be provided for more batteries, if desired. Other supporting structures (not visible in FIG. 1) are situated at rear 60 of shelf unit 12 to establish shelf unit 12 as a rigid structure for supporting batteries.

Shelf 46 is illustrated without batteries installed to reveal battery retaining wells 62, 64, 66, 68 into which batteries may be situated to limit lateral movement by batteries on shelf 46 and to assure proper spacing of batteries on shelf 46. Shelf 46 presents a raised lip 47 having various widths substantially circumscribing the perimeter of shelf 46. Raised rib patterns 61, 63, 65, 67 within retaining wells 62, 64, 66, 68 provide a space between batteries and shelf 46 to ensure air circulation around batteries situated in retaining wells 62, 64, 66, 68. Other shelves 14, 26 are constructed similar to shelf 46 with retaining wells, raised lips and raised rib patterns. A hoist apparatus 70 configured according to the teachings of the present invention is illustrated in an installed orientation engaging lip 47 (and a rear support member not visible in FIG. 1) for hoisting a battery.

Figure 2:
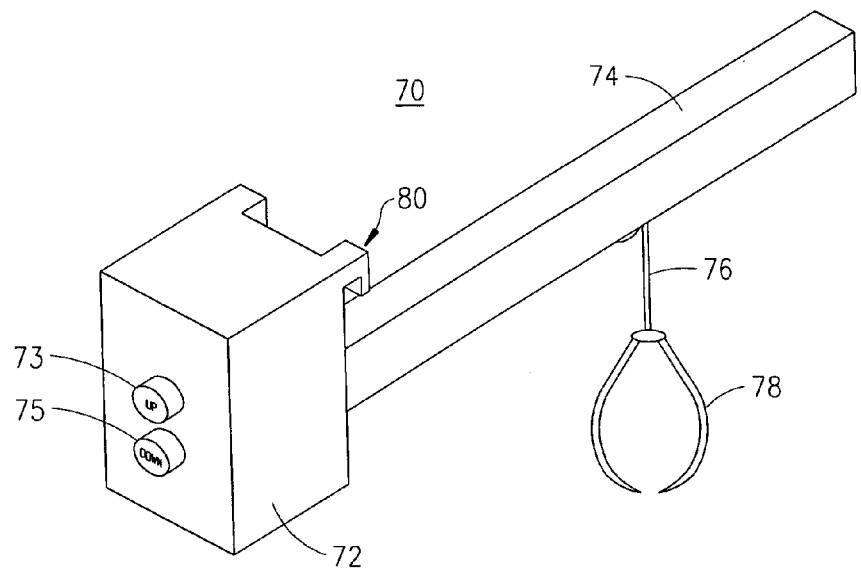
FIG. 2 is a perspective view of the preferred embodiment of the present invention.

FIG. 2 is a perspective view of the preferred embodiment of the present invention. In FIG. 2, a hoist 70 includes a rotary drive unit 72 and a motion translation unit 74. Rotary drive unit 72 preferably contains a motor unit (not shown in FIG. 2) controlled by control buttons 73, 75. In its most preferred embodiment, hoist 70 is battery powered and a battery is also contained within hoist 70 (not shown in FIG. 2). Alternatively, rotary drive unit 72 may be powered by an electric motor powered by an outside source, as by a power cord to an electrical wall socket; by a manual cranking mechanism; or by an external source of rotational force such as an electric drill or the like (not shown in FIG. 2). Motion translation unit 74 may be embodied in any mechanical or electrical unit that translates rotational force to linear force, such as a screw jack unit, a screw jack unit with a cable-and-pulley assembly to provide improved mechanical advantage, a hydraulic cylinder or other motion translating device. A connection structure 76, such as a cord or cable, depends from motion translation unit 74 and engages a battery (not shown in FIG. 2) via an engaging structure 78, such as an opposing arm structure configured similar to ice tongs, to effect movement of the battery in a substantially linear motion along an axis substantially coincident with connection structure 76. When hoist 70 is installed in a shelf structure (FIG. 1), the direction of motion imparted to a battery by connection structure 76 is substantially vertical. Other engaging structures 78 may be employed to advantage with hoist 70 including, by way of illustration and not by way of limitation, a lifting ring snugly encircling a battery or any other structure that can engage a battery for lifting.

A hook structure 80 is integrally formed with rotary drive unit 72 for hanging hoist 70 upon a shelf, as will be described in greater detail hereinafter in connection with FIG. 3.

Figure 3:
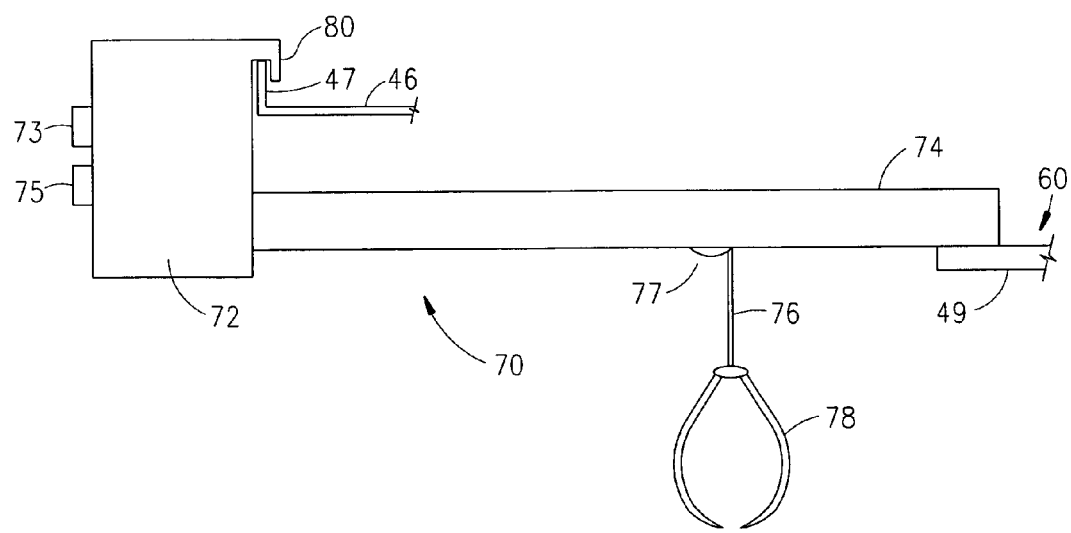
FIG. 3 is a side view of the present invention in an installed orientation for effecting movement of a battery.

FIG. 3 is a side view of the present invention in an installed orientation for effecting movement of a battery. In FIG. 3, hoist 70 includes rotary drive unit 72 and motion translation unit 74. Rotary drive unit 72 preferably contains a motor unit (not shown in FIG. 3) controlled by control buttons 73, 75. Connection structure 76 passes over a roller unit 77 depending from motion translation unit 74 and engages a battery (not shown in FIG. 3) via engaging structure 78 to effect movement of the battery in a substantially linear motion along an axis substantially coincident with connection structure 76.

Hook structure 80 is integrally formed with rotary drive unit 72. Hook structure 80 hookingly engages lip 47 for hanging hoist 70 upon shelf 46 (FIG. 1). A support element 49 is preferably integrally provided at the rear 60 of shelf unit 12 (support element 49 is not visible in FIG. 1) for supporting motion translation unit 74 of hoist 70. When a battery (not shown in FIG. 3) is suspended upon connection structure 76, its weight will securely situate hook structure 80 against lip 47 of shelf 46 and will securely situate motion translation unit 74 against support element 49, thereby securely positioning hoist 70 with shelf unit 12 (FIG. 1) for lifting operations. When hoist 70 is installed in a shelf structure as illustrated in FIG. 3, the direction of motion imparted to a battery by connection structure 76 is substantially vertical. Raising a battery sufficiently to clear its retaining well (e.g., retaining wells 62, 64, 66, 68; FIG. 1) permits inserting a planar support member or platform (not shown in FIG. 3) beneath the raised battery to effect sliding the battery horizontally out of alignment with its retaining well and removal to a cart or other means for moving the battery.

Figure 4:
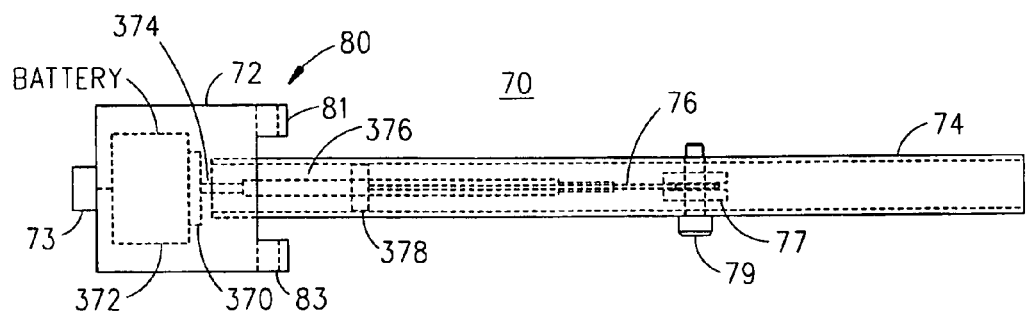
FIG. 4 is a top view of the preferred embodiment of the present invention illustrated in FIG. 2.
Figure 5:
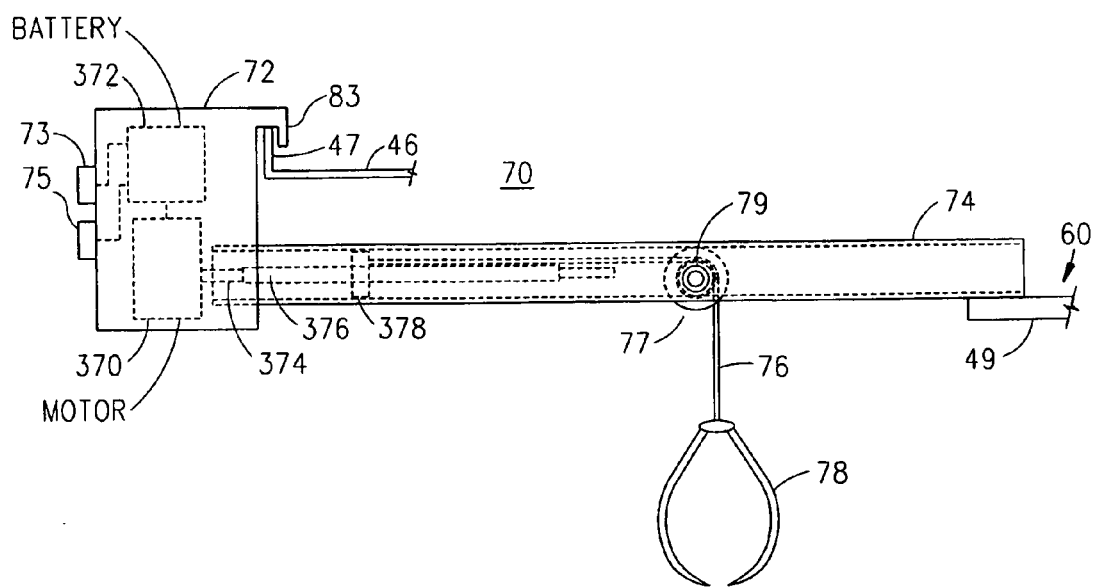
FIG. 5 is a side view of the preferred embodiment of the present invention illustrated in FIG. 2.

FIG. 4 is a top view of the preferred embodiment of the present invention illustrated in FIG. 2. FIG. 5 is a side view of the preferred embodiment of the present invention illustrated in FIG. 2. In FIGS. 4 and 5, hoist 70 includes rotary drive unit 72 and motion translation unit 74. Rotary drive unit 72 contains a motor unit 370 powered by a battery unit 372. Motor unit 370 and battery unit are controlled by control buttons 73, 75. Connection structure 76 passes over a roller unit 77 depending from motion translation unit 74 and engages a battery (not shown in FIGS. 4 & 5) to effect movement of the battery in a substantially linear motion along an axis substantially coincident with connection structure 76.

Motor 370 imparts a rotary motion to a shaft 374. Thus, motor 370 is a motion generating unit presenting a first rotary force at a first output locus embodied in shaft 374. Shaft 374 is coupled with a screw structure 376. Alternatively, shaft 374 may be integrally formed with screw structure 376. A screw follower unit 378 engages screw structure 376. Screw follower unit 378 responds to rotation of screw structure 376 in a first direction by moving toward rotary drive unit 72. Screw follower unit 378 responds to rotation of screw structure 376 in a second direction opposite to the first direction first direction by moving away from rotary drive unit 72. Thus, screw follower unit 378 is a motion translating unit coupled with the first output locus (shaft 374) for receiving the rotary force presented by motor 370. The motion translating unit embodied in screw follower unit 378 translates the rotary force and motion received from shaft 374 to present a linear force and motion related t6 the rotary force received from shaft 374 at connection structure 76. Connection structure 76 is connected with screw follower unit 378 and led over roller unit 77. Roller unit 77 is freely rotating on an axle 79. Axle 79 has been omitted from other drawings herein in order to reduce clutter and to simplify those other drawings. When screw follower unit 378 responds to rotation of screw structure 376 in the first direction by moving toward rotary drive unit 72, connection structure 76 is pulled upward and over roller unit 77, thereby lifting a battery (not shown in FIGS. 4 & 5).

Hook structure 80 is integrally formed with rotary drive unit 72. Hook structure 80 may be configured as two separate hooks 81, 83, as illustrated in FIGS. 4 & 5. Hook structure 80 hookingly engages lip 47 for hanging hoist 70 upon shelf 46 (FIG. 1). Alternatively, hook structure 80 may be configured as a single channel substantially spanning the width of rotary drive unit 72 (not shown in FIGS. 4 & 5) for hooking onto lip 47 of shelf 46. A support element 49 is preferably integrally provided at the rear 60 of shelf unit 12 (support element 49 is not visible in FIG. 1) for supporting motion translation unit 74 of hoist 70. When a battery (not shown in FIGS. 4 & 5) is suspended upon connection structure 76, its weight will securely situate hook structure 80 against lip 47 of shelf 46 and will securely situate motion translation unit 74 against support element 49, thereby securely establishing hoist 70 with shelf unit 12 (FIG. 1) for hoisting operations.

Figure 6:
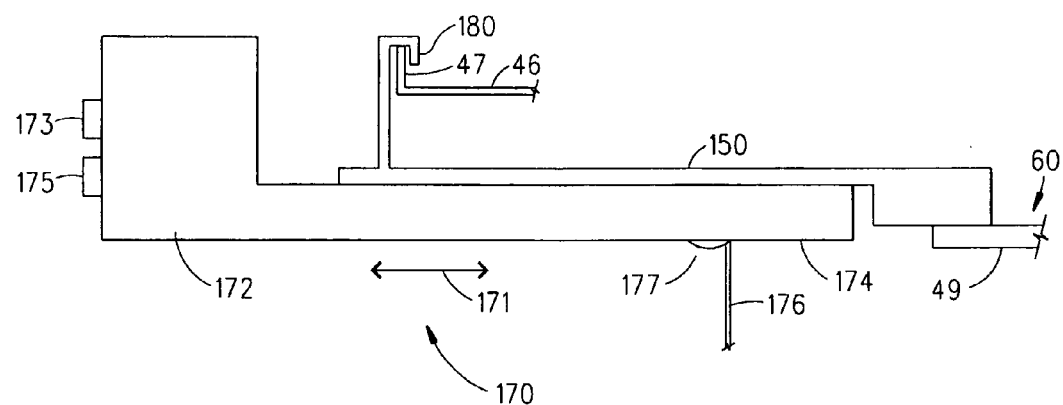
FIG. 6 is a side view of a first alternate embodiment of the present invention.

FIG. 6 is a side view of a first alternate embodiment of the present invention. In FIG. 6, a hoist 170 includes rotary drive unit 172 and motion translation unit 174. Rotary drive unit 172 preferably contains a motor unit (not shown in FIG. 6) controlled by control buttons 173, 175. Connection structure 176 passes over a roller unit 177 depending from motion translation unit 174 and engages a battery (not shown in FIG. 6) to effect movement of the battery in a substantially linear motion along an axis substantially coincident with connection structure 176.

Motion translation unit 174 is slidingly engaged with a support structure 150 to permit motion translation unit 174 to move back and forth in sliding motion generally as indicated by a double-ended arrow 171. Sliding engagement may be effected by suspending motor translation unit 174 with support structure 150 using a channel and groove arrangement, using a drawer-slide type of arrangement or using another arrangement that permits the desired sliding movement of motion translation unit 174 as indicated.

A hook structure 180 is integrally formed with support structure 150. Hook structure 180 hookingly engages lip 47 for hanging hoist 170 upon shelf 46 (FIG. 1). A support element 49 is preferably integrally provided at the rear 60 of shelf unit 12 (support element 49 is not visible in FIG. 1) for supporting support structure 150 of hoist 170. When a battery (not shown in FIG. 6) is suspended upon connection structure 176, its weight will securely situate hook structure 180 against lip 47 of shelf 46 and will securely situate support unit 150 against support element 49, thereby securely positioning hoist 170 with shelf unit 12 (FIG. 1) for hoisting operations. When hoist 170 is installed in a shelf structure as illustrated in FIG. 6, the direction of motion imparted to a battery by connection structure 176 is substantially vertical. Moving motion translation unit 174 in sliding engagement with support structure 150 in the directions indicated by arrow 171 moves a battery suspended by connection structure 176 in a horizontal direction.

Raising a battery sufficiently to clear its retaining well (e.g., retaining wells 62, 64, 66, 68; FIG. 1) permits moving a battery horizontally to a cart or other means for moving the battery. Such a capability for horizontal movement avoids any need for a planar support member or platform beneath the raised battery to effect sliding the battery horizontally out of alignment with its retaining well.

Figure 7:
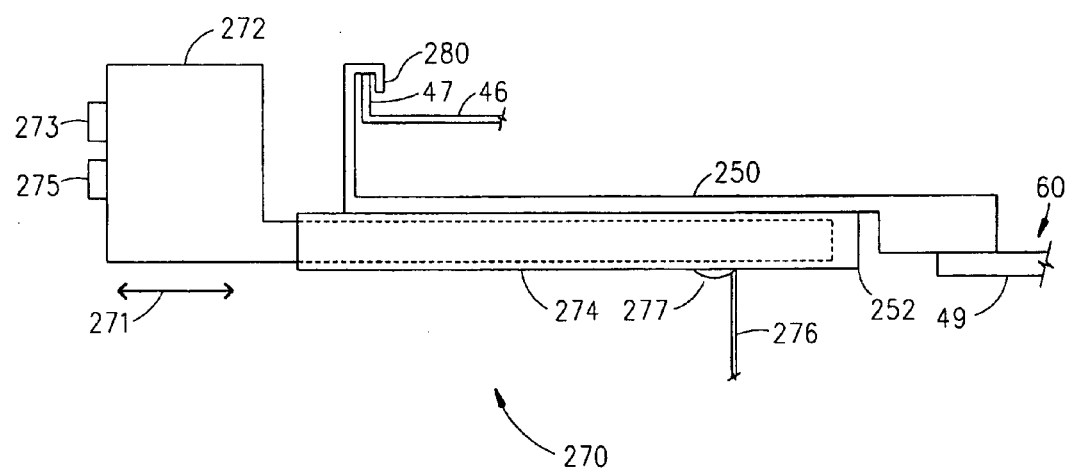
FIG. 7 is a side view of a second alternate embodiment of the present invention.

FIG. 7 is a side view of a second alternate embodiment of the present invention. In FIG. 7, a hoist 270 includes rotary drive unit 272 and motion translation unit 274. Rotary drive unit 272 preferably contains a motor unit (not shown in FIG.

7) controlled by control buttons 273, 275. Connection structure 276 passes over a roller unit 277 depending from motion translation unit 274 and engages a battery (not shown in FIG. 7) to effect movement of the battery in a substantially linear motion along an axis substantially coincident with connection structure 276.

A support structure 250 includes a receiver section 252. Motion translation unit 274 is slidingly or telescopically received within receiver section 252 to permit motion translation unit 274 to move back and forth in sliding motion generally as indicated by a double-ended arrow 271.

A hook structure 280 is integrally formed with support structure 250. Hook structure 280 hookingly engages lip 47 for hanging hoist 270 upon shelf 46 (FIG. 1). A support element 49 is preferably integrally provided at the rear 60 of shelf unit 12 (support element 49 is not visible in FIG. 1) for supporting support structure 250 of hoist 270. When a battery (not shown in FIG. 7) is suspended upon connection structure 276, its weight will securely situate hook structure 280 against lip 47 of shelf 46 and will securely situate support unit 250 against support element 49, thereby securely establishing hoist 270 with shelf unit 12 (FIG. 1) for hoisting operations. When hoist 270 is installed in a shelf structure as illustrated in FIG. 7, the direction of motion imparted to a battery by connection structure 276 is substantially vertical. Moving motion translation unit 274 in sliding telescopic engagement with support structure 250 in the directions indicated by arrow 271 moves a battery suspended by connection structure 276 in a horizontal direction.

Raising a battery sufficiently to clear its retaining well (e.g., retaining wells 62, 64, 66, 68; FIG. 1) permits moving a battery horizontally to a cart or other means for moving the battery without any need for a planar support member or platform beneath the raised battery to effect sliding the battery horizontally out of alignment with its retaining well.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. A system for moving a battery with respect to an installed orientation at a site; the system comprising:
   (a) a motion generating unit; said motion generating unit presenting a first force at a first output locus; said first force being manifested in a first motion type;
   (b) a motion translating unit coupled with said first output locus for receiving said first force; said motion translating unit translating said first force to present a second force related to said first force at a second output locus; said second force being manifested in a second motion type;
   (c) a battery engaging structure coupled with said second output locus for applying said second force to said battery;
   (d) a shelf unit at said site for supporting said battery in said installed orientation; said shelf unit including a plurality of generally horizontal shelves substantially fixedly arranged in a generally vertical array; said installed orientation being situated on a first shelf of said shelf unit; and
   (e) a substantially rigid frame supporting said motion generating unit and said motion translating unit; said frame being configured for hookingly engaging a second shelf of said shelf unit to substantially fixedly situate said frame with respect to said shelf unit during said moving; said second shelf being above said first shelf;

said moving being effected in a generally vertical axis in response to said second force.

2. A system for moving a battery with respect to an installed orientation at a site as recited in claim 1 wherein said first motion type is rotary motion and wherein said second motion type is linear motion.

3. A system for moving a battery with respect to an installed orientation at a site as recited in claim 1 wherein said motion generating unit responds to a force generating unit; said force generating unit being an integral portion of said motion generating unit.

4. A system for moving a battery with respect to an installed orientation at a site as recited in claim 1 wherein said motion generating unit responds to a force generating unit; said force generating unit being a separate device from said motion generating unit and configured for connection with said motion generating unit to impart an initiating force to said motion generating unit; said first force being related to said initiating force.

5. A system for moving a battery with respect to an installed orientation at a site as recited in claim 3 wherein said force generating unit is an electrically operated force generating unit.

6. A system for moving a battery with respect to an installed orientation at a site as recited in claim 5 wherein said force generating unit is battery powered.

7. A system for moving a battery with respect to an installed orientation at a site as recited in claim 1 wherein said motion translating unit is a screw jack device.

8. A system for moving a battery with respect to an installed orientation at a site as recited in claim 7 wherein said motion translating unit further includes a cable-and-pulley device coupled with said screw jack device.

9. A system for moving a battery with respect to an installed orientation at a site as recited in claim 1 wherein said frame is configured in a telescoping structure to effect slidingly moving said battery in a generally horizontal axis.

10. A system for moving a lead-acid battery in a telecommunication facility; the system comprising:
    (a) a motion generating unit; said motion generating unit presenting a first force at a first output locus; said first force being manifested in a first motion type;
    (b) a motion translating unit coupled with said first output locus for receiving said first force; said motion translating unit translating said first force to present a second force related to said first force at a second output locus; said second force being manifested in a second motion type;
    (c) a battery engaging structure coupled with said second output locus for applying said second force to said battery;
    (d) a shelf unit at said site for supporting said battery in said installed orientation; said shelf unit including a plurality of generally horizontal shelves substantially fixedly arranged in a generally vertical array; said installed orientation being situated on a first shelf of said shelf unit; and
    (e) a substantially rigid frame supporting said motion generating unit and said motion translating unit; said frame being configured for hookingly engaging a second shelf of said shelf unit to substantially fixedly situate said frame with respect to said shelf unit during said moving; said second shelf being above said first shelf.

11. A system for moving a lead-acid battery in a telecommunication facility as recited in claim 10 wherein said first motion type is rotary motion and wherein said second motion type is linear motion.

12. A system for moving a lead-acid battery in a telecommunication facility as recited in claim 10 wherein said motion generating unit is an electrically operated motion generating unit.

13. A system for moving a lead-acid battery in a telecommunication facility as recited in claim 12 wherein said motion generating unit is battery powered.

14. A system for moving a lead-acid battery in a telecommunication facility as recited in claim 10 wherein said motion translating unit is a screw jack device.

15. A system for moving a lead-acid battery in a telecommunication facility as recited in claim 10 wherein said frame is configured in a telescoping structure to effect slidingly moving said battery in a generally horizontal axis.

* * * * *